United States Patent Office 2,726,457
Patented Dec. 13, 1955

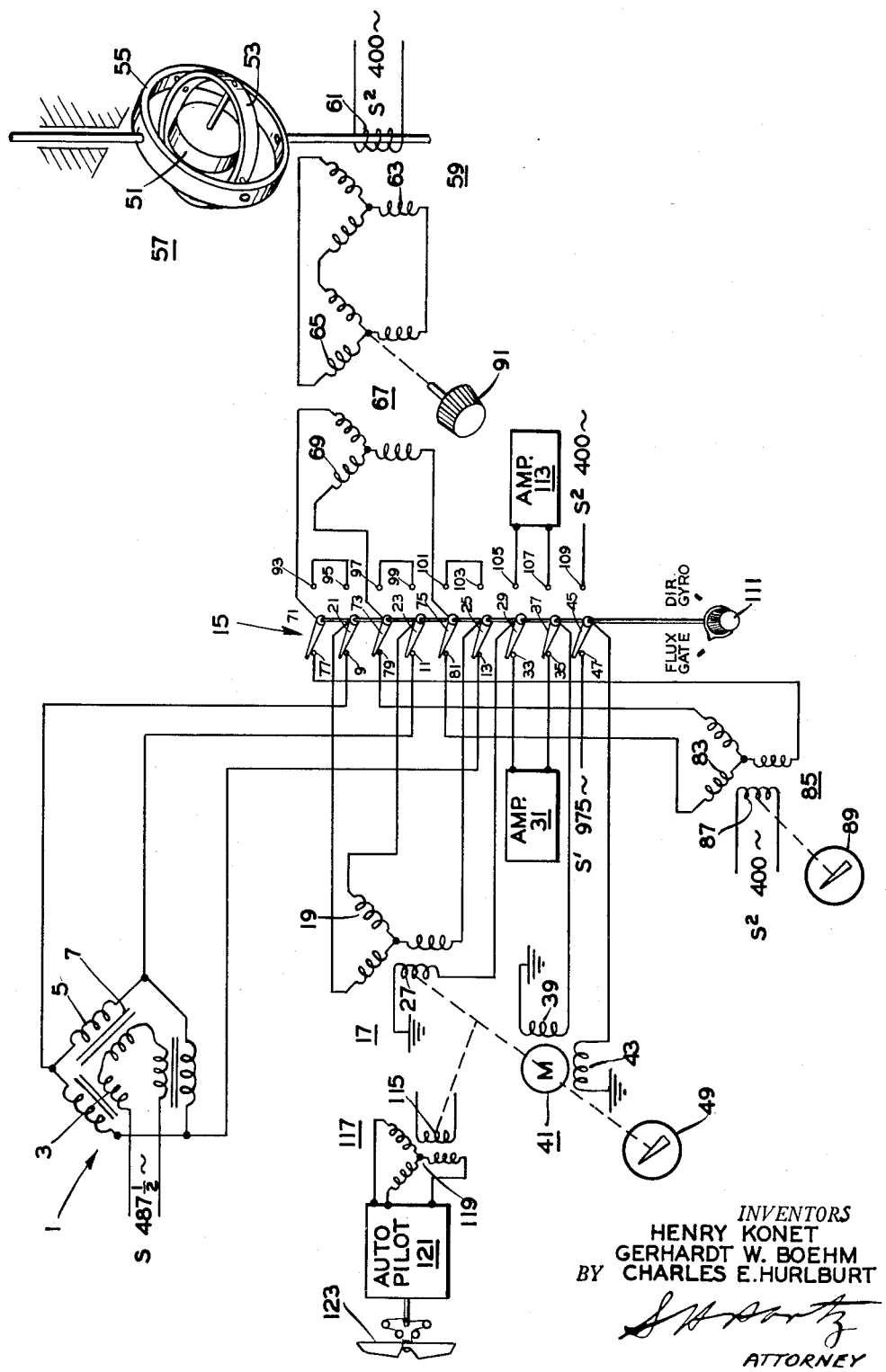

2,726,457
COMPASS SYSTEM

Henry Konet, Hohokus, Gerhardt W. Boehm, Bergenfield, and Charles E. Hurlburt, Teaneck, N. J., assignors to Bendix Aviation Corporation, Teterboro, N. J., a corporation of Delaware Application January 5, 1953, Serial No. 329,566

8 Claims. (Cl. 33—222)

The invention relates to direction maintaining means for use on dirigible craft and, more particularly, to compass systems serving as navigational instruments and as base lines for automatic steering.

Compass systems used heretofore utilizing the earth's magnetic field as a reference are satisfactory when the craft mounting the compass is flying a substantial distance from the earth's magnetic pole, but when such compasses are used within approximately 1000 miles of the pole, they cannot be relied upon because of the decrease in the horizontal component of the earth's magnetic field and because of rapid heading variations.

One object of the present invention is to provide a compass system which maintains an accurate direction reference for guiding the craft irrespective of the latitude in which the craft is flying.

Another object is to provide a compass system which is controlled selectively by means responding to the earth's magnetic field in regions where it is reliable and to a gyroscopic reference in regions where the earth's magnetic field cannot be relied upon.

Another object is to synchronize the gyroscopic means with the magnetic means without precessing the gyroscope.

The invention contemplates a compass system having magnetic means responsive to the earth's magnetic field, a directional gyroscope with a signal generator, and a directional indicator selectively responsive to the output of the magnetic means and the signal generator. An electrical differential device is provided to synchronize the output of the directional gyro signal generator to the magnetic means without precessing the gyroscope.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing is a schematic diagram showing a compass system constructed according to the invention.

Referring now to the drawing for a more detailed description of the novel compass system of the present invention, the compass system is shown as comprising a flux valve 1 having an excited winding 3 and a secondary winding 5 wound on a triangular core 7 of magnetic material. Excited winding 3 is connected to an alternating power source S of 487½ cycles per second and a second harmonic voltage is induced in secondary winding 5 corresponding to the direction of the earth's magnetic field. Secondary winding 5 is connected in delta fashion to contacts 9, 11, 13 of a 9-pole-double-throw switch 15.

A receiver inductive device 17 has a three-phase Y connected stator winding 19 connected to armatures 21, 23 and 25 associated with contacts 9, 11 and 13, respectively, of switch 15. Inductive device 17 has a single phase rotor winding 27 with one terminal connected to ground and the other terminal connected to armature 29 of switch 15.

An amplifier 31 has its input connected to contact 33 associated with armature 29 and its output connected to contact 35 associated with armature 37 of switch 15 connected to one terminal of variable phase winding 39 of a two-phase reversible induction motor 41. The other terminal of winding 39 is connected to ground. Fixed phase winding 43 of motor 41 has one terminal connected to ground, and its other terminal is connected to armature 45 associated with contact 47 of switch 15 which is connected to a power source S' of twice the frequency of power source S or 975 cycles per second. Power sources S and S' preferably are locked together to maintain the frequency of source S' at twice the frequency of source S. Motor 41 is drivably connected to rotor winding 27 of inductive device 17 and to a master direction indicator 49 for indicating the direction in which the craft mounting the system is flying.

With switch 15 in the position indicated in the drawing, secondary winding 5 of flux valve 1 is connected back to back to stator winding 19 of inductive device 17 through contacts 9, 11, 13 and armatures 21, 23, 25. If rotor winding 27 of inductive device 17 is not in coincidence with the earth's magnetic field, then an error signal appears across rotor winding 27 and the error signal is applied to the input of amplifier 31 through armature 29 and contact 33 and the output of the amplifier energizes variable phase winding 39 of motor 41 through contact 35 and armature 37. Motor 41 drives rotor winding 27 of inductive device 17 to null position and simultaneously operates indicator 49 to indicate the direction in which the craft is flying.

The system also includes a directional gyroscope having a rotor 51 spinning about a horizontal axis in a support 53 rotatably supported by a gimbal 55 mounted for angular movement in a housing 57. The spin axis may be maintained in a horizontal plane by any suitable erecting means (not shown).

An inductive pick-off device 59 has a rotor winding 61 drivably connected to gimbal 55 and is energized by a power source $S^2$ of 400 cycles per second. Pick-off device 59 has a three-phase secondary winding 63 connected back to back to a three-phase rotor winding 65 of an inductive differential device 67. Differential device 67 has a three-phase stator winding 69 connected to armatures 71, 73 and 75 associated with contacts 77, 79 and 81, respectively, of switch 15 which are connected to three-phase stator winding 83 of a repeater 85 having its rotor winding 87 energized by source $S^2$ and drivably connected to an indicator 89.

Directional signals from gyroscope pick-off 59 are transmitted through differential 67 and armatures 71, 73, 75 and contacts 77, 79, 81 of switch 15 to repeater 85 and control the repeater which provides a directional indication on indicator 89. The indication on indicator 89 may be adjusted to correspond to the indication on indicator 49 by rotating rotor winding 65 of differential 67 by means of a manually operated knob 91 drivably connected thereto.

When the craft is flying in an area where the earth's magnetic field soon will be unreliable as a directional reference, the flux valve is disconnected from motor 41 and the gyroscope is connected thereto to provide a directional reference for master direction indicator 49 by operating switch 15. The output of directional gyroscope pickoff 59 is first synchronized with the output of the flux valve by adjusting rotor winding 65 of differential device 67 by means of knob 91 in the manner described above so that the direction indication on indicator 89 corresponds to the direction indication on indicator 49. Switch 15 is then operated by means of a knob 111 so that armatures 71, 21, 73, 23, 75, 25, 29, 37 and 45 of switch 15 are disengaged from contacts 77, 9, 79, 11, 81, 13, 33, 35 and 47, respectively, and are moved into engagement with contacts 93, 95, 97, 99, 101, 103, 105, 107 and 109, respectively. Contacts 93 and 95 are connected together, contacts 97 and 99 are connected together and contacts 101 and 103 are connected together. Contact 105 is connected to the input of an amplifier 113 and contact 107 is connected to the output of the amplifier. Contact 109 is connected to source $S^2$ of 400 cycles per second.

With the armatures in the positions just described, the signals from gyroscope pick-off 59 are applied through differential device 67 and armatures 71, 21, 73, 23, 75, 25 and contacts 93, 95, 97, 99, 101, 103 to stator winding 19 of inductive device 17. The error signal appearing on rotor winding 27 of inductive device 17 is applied through armature 29 and contact 105 to amplifier 113 and the output of the amplifier is applied through contact 107 and armature 37 to variable phase winding 39 of motor 41. The amplified signal energizing motor 41 is a 400 cycle signal and fixed phase winding 43 of motor 41 is energized by source $S^2$ of 400 cycles through contact 109 and armature 45. Motor 41 drives rotor 27 of inductive device 17 to null position with respect to the signal appearing at pick-off 59 and indicates on indicator 49 the direction in which the craft is flying.

If the directional gyroscope is made to precess zero degrees at the equator, then at 70 degrees north latitude the precession rate of the gyroscope will be about 14 degrees per hour and the navigator when flying at this latitude periodically adjusts rotor 65 of differential device 67 by means of knob 91 to correct indicator 49 for precession of the gyroscope. If the craft mounting the system, flies under gyroscope direction almost exclusively in the northern latitudes near the pole, then the gyroscope can be made to precess any desired amount so that the navigator need make no corrections by means of differential device 67 on direction indicator 49 when it is controlled by the directional gyroscope.

In addition to indicating direction, the compass system may be used to control an automatic pilot for steering the craft. Motor 41 may be drivably connected to the rotor winding 115 of a transmitter inductive device 117 having a three-phase stator winding 119 providing signals to an automatic pilot 121 to operate a control surface 123 of the craft to maintain the craft on a fixed course.

The compass system described herein and constructed according to the invention maintains an accurate direction reference for guiding the craft irrespective of the latitude in which the craft is flying. As described above, the compass system responds to the earth's magnetic field in regions where the earth's magnetic field is reliable, and in other regions where the earth's magnetic field is unreliable, a gyroscopic reference is used. The compass system may serve as a nagivational instrument and as a base line for automatic steering.

While separate amplifiers 31 and 113 are used for amplifying signals from flux valve 1 and gyroscope pick-off 59, respectively, in some instances it may be desirable to use only a single amplifier for both the flux valve and directional gyroscope pick-off and, in this event, the amplifier may be connected permanently in the circuit and the associated contacts and armatures will be unnecessary.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a compass system of the class described, a device responsive to the earth's magnetic field, a receiver device connected to said responsive device, a motor responsive to the error signal between said responsive device and said receiver device and arranged to drive said receiver device to null position, a master direction indicator drivably connected to said motor for indicating direction in response to said responsive device, a directional gyroscope, a signal generator operated by said gyroscope, a repeater connected to said signal generator and receiving signals therefrom, an indicator drivably connected to said repeater for indicating direction in response to said gyroscope, and switching means connecting said responsive device to said receiver device and connecting said signal generator to said repeater, said switching means being operable to disconnect said responsive device from said receiver device and to connect said signal generator thereto so that said directional gyroscope controls operation of said master direction indicator.

2. In a compass system of the class described, means responsive to the earth's magnetic field, a directional gyroscope, a direction indicator selectively responsive to said responsive device and to said directional gyroscope, switching means for selectively operatively connecting said indicator to said responsive device and to said directional gyroscope, and differential means for synchronizing the response of said direction indicator to said responsive device and to said directional gyroscope.

3. In a compass system of the class described, means responsive to the earth's magnetic field, a master direction indicator operatively connected to said means and responsive thereto, a directional gyroscope, an indicator operatively connected to said gyroscope and responsive thereto, differential means for synchronizing the direction indication of said indicators, and switching means for operatively connecting said directional gyroscope to said master direction indicator.

4. In a system of the class described, a device responsive to the earth's magnetic field, a receiver device connected to said responsive device, a motor responsive to the error signal between said responsive device and said receiver device and arranged to drive said receiver device to null position, a master direction indicator drivably connected to said motor for indicating direction in response to said responsive device, a directional gyroscope, a signal generator operated by said gyroscope, an electrical differential connected to said signal generator and receiving signals therefrom, a repeater connected to said differential, an indicator drivably connected to said repeater for indicating direction in response to said gyroscope, means for operating said differential to synchronize said direction indicators, and switching means connecting said responsive device to said receiver device and connecting said differential to said repeater, said switching means being operable to disconnect said responsive device from said receiver device and to connect said differential thereto so that said directional gyroscope controls operation of said master direction indicator.

5. In a compass system of the class described, a device responsive to the earth's magnetic field, a receiver device connected to said responsive device, a responsive device amplifier for receiving the error signal between said responsive device and said receiver device, a motor responsive to the output of said amplifier and arranged to drive said receiver device to null position, a master direction indicator drivably connected to said motor for indicating direction in response to said responsive device, a directional gyroscope, a signal generator operated by said gyroscope, an auxiliary amplifier, and switching means connecting said responsive device to said receiver device and connecting said responsive device amplifier to said receiver device and to said motor, said switching means being operable to disconnect said responsive device from said receiver device and to disconnect said responsive device amplifier from said receiver device and from said motor and to connect said signal generator to said receiver device and to connect said auxiliary amplifier to said receiver device and to said motor so that said directional gyroscope controls operation of said master direction indicator through said auxiliary amplifier.

6. In a compass system of the class described, a device responsive to the earth's magnetic field, a receiver device connected to said responsive device, a responsive device amplifier for receiving the error signal between said responsive device and said receiver device, a motor responsive to the output of said amplifier and arranged to drive said receiver device to null position, a master direction indicator drivably connected to said motor for indicating direction in response to said responsive device, a directional gyroscope, a signal generator operated by said gyroscope, a repeater connected to said signal generator and receiving signals therefrom, an indicator drivably connected to said repeater for indicating direction in response to said gyroscope, an auxiliary amplifier, and switching means connecting said responsive device to said receiver device and connecting said responsive device amplifier to said receiver device and to said motor and connecting said signal generator to said repeater, said switching means being operable to disconnect said responsive device from said receiver device and to disconnect said responsive device amplifier from said receiver device and from said motor and to connect said signal generator to said receiver device and to connect said auxiliary amplifier to said receiver device and to said motor so that said directional gyroscope controls operation of said master direction indicator through said auxiliary amplifier.

7. In a compass system of the class described, a device responsive to the earth's magnetic field and energized by an alternating power source and providing signals having a frequency of twice the frequency of the power source, a two-phase inductive motor having one of its phases energized by a power source of twice the frequency of the energizing source and having its variable phase responsive to signals from said responsive device, a directional gyroscope, a signal generator operated by said gyroscope and providing signals corresponding to the relative position of said craft and said gyroscope, alternating current means for energizing said signal generator, and switching means for selectively connecting said responsive device and said signal generator to said motor for controlling its operation, said switching means connecting said fixed phase of said motor to said double frequency power source when said responsive device controls operation of said motor and connecting said fixed phase of said motor to said alternating current means when said signal generator controls operation of said motor.

8. In a system of the class described for use on dirigible craft, a directional device adapted to provide signals in response to the earth's magnetic field, a directional gyroscope, a signal generator operated by said directional gyroscope and adapted to provide signals corresponding to the relative positions of said directional gyroscope and the craft, an automatic pilot for operating a craft control surface to guide the craft, switching means for selectively connecting said directional device and said signal generator to control said automatic pilot to guide the craft thereby, and differential means for synchronizing the signals from said directional device and said signal generator.

References Cited in the file of this patent

UNITED STATES PATENTS

| | | |
|---|---|---|
| 2,346,849 | Lear | Apr. 18, 1944 |
| 2,554,246 | Emerson | May 22, 1951 |
| 2,647,233 | Kutzler | July 28, 1953 |

FOREIGN PATENTS

| | | |
|---|---|---|
| 681,926 | Great Britain | Oct. 29, 1952 |